United States Patent [19]
Zeidler et al.

[11] Patent Number: 5,801,789
[45] Date of Patent: *Sep. 1, 1998

[54] METHOD AND APPARATUS FOR OVERLAYING DIGITALLY GENERATED GRAPHICS OVER AN ANALOG VIDEO SIGNAL

[75] Inventors: David E. Zeidler, Warrington; Robert M. Simons, Lansdale, both of Pa.; Qiang Zhu, Columbus, N.J.

[73] Assignee: General Instrument Corporation, Horsham, Pa.

[*] Notice: The term of this patent shall not extend beyond the expiration date of Pat. No. 5,541,666.

[21] Appl. No.: 620,924

[22] Filed: Mar. 22, 1996

Related U.S. Application Data

[63] Continuation-in-part of Ser. No. 271,026, Jul. 6, 1994.
[51] Int. Cl.[6] ................................................ H04N 5/262
[52] U.S. Cl. ................................. 348/589; 348/584
[58] Field of Search ........................... 348/578, 584, 348/585, 586, 589, 588; 358/22, 183; H04N 9/74, 5/272, 5/262, 5/265

[56] References Cited

U.S. PATENT DOCUMENTS

| | | | |
|---|---|---|---|
| 4,498,098 | 2/1985 | Stell | 358/22 |
| 4,531,154 | 7/1985 | Hallock | 348/510 |
| 4,580,165 | 4/1986 | Patton et al. | 358/148 |
| 4,631,588 | 12/1986 | Barnes et al. | 358/149 |
| 4,639,765 | 1/1987 | D'Hont | 358/19 |
| 4,675,737 | 6/1987 | Fujino et al. | 358/183 |
| 4,999,709 | 3/1991 | Yamazaki et al. | 358/160 |
| 5,051,817 | 9/1991 | Takano | 358/22 |
| 5,065,143 | 11/1991 | Greaves et al. | 348/154 |
| 5,126,832 | 6/1992 | Lee et al. | 358/22 |
| 5,146,336 | 9/1992 | Tessier et al. | 348/512 |
| 5,185,603 | 2/1993 | Medin | 340/814 |
| 5,541,666 | 7/1996 | Zeidler et al. | 348/589 |

FOREIGN PATENT DOCUMENTS

| | | |
|---|---|---|
| 89121325 | 11/1989 | European Pat. Off. . |
| 90112318 | 6/1990 | European Pat. Off. . |
| 93200426 | 2/1993 | European Pat. Off. . |
| 4368078 | 6/1991 | Japan . |

OTHER PUBLICATIONS

An Article entitled "A Low Cost, General Purpose S–Video, PAL/NTSC Encoder" by G.W. Perkins et a., published in IEEE/transactions onConsumer Electronics, vol. 38,No. 3 Aug., 1992.

*Primary Examiner*—Chris Grant
*Attorney, Agent, or Firm*—Volpe and Koenig, P.C.

[57] ABSTRACT

A system for overlaying digital character signals on an analog video source signal including a predetermined color subcarrier includes a digital character generating device, a digital video encoder, and a switching device. The digital character generating device detects horizontal and vertical timing of pixel information in the analog video source signal, and generates digital character signals that are to be overlaid in predetermined pixels of the analog video source signal. The digital video encoder is responsive to the color subcarrier signal for generating a separate color subcarrier which is locked to the predetermined color subcarrier of the analog video source signal. The digital video encoder also converts the digital character signals from the digital character generating device into an analog video output signal that includes the color subcarrier generated in the digital video encoder. The swithching device directs the analog video output signal from the digital video encoder or the analog video source signal to an output of the system during pixels times when a digital character is to be overlaid or not overlaid, respectively, on the analog video source signal.

33 Claims, 4 Drawing Sheets

METHOD AND APPARATUS FOR OVERLAYING DIGITALLY GENERATED GRAPHICS OVER AN ANALOG VIDEO SIGNAL

CROSS-REFERENCE TO RELATED PATENT APPLICATIONS

This is a Continuation-In-Part of U.S. patent application Ser. No. 08/271,026, filed on Jul. 6, 1994.

FIELD OF THE INVENTION

The present invention relates to method and apparatus for overlaying digitally generated graphics over an analog video signal in, for example, Cable Television (CATV) converters, Video Cassette Recorders (VCRs), and On Screen Displays (OSDs).

BACKGROUND OF THE INVENTION

Various arrangements are known for overlaying graphic images over a video signal received from a separate remote source as, for example, a broadcast television system, a video disk, or a video tape recorder. These graphic images can be, for example, alphanumeric characters for display on a television monitor also displaying the video picture as derived from the received video signal.

U.S. Pat. No. 4,639,765 (D'Hont), issued on Jan. 27, 1987, discloses a synchronization system for overlaying an internal video signal upon an external video signal. Phase synchronization of the internal video signal with the external video signal is achieved by generating a video clock signal having a frequency which is a predetermined multiple of the horizontal line rate of the external video signal. This video clock enables generation of horizontal lines which have a predetermined phase relation to the external video signals. Still further, the frames of the internal video signal are phase synchronized with the frames of the external video signal. This is achieved by detecting the vertical reset pulses of the external video signal and resetting the video generator when such external video signal vertical reset pulses are received. Loss of the external video signal causes the system to operate in an "internal only" mode until the external video signal is again received. When reacquiring the external video signal, the system re-synchronizes to the external video signal for a return to an external mode of operation.

U.S. Pat. No. 5,051,817 (Takano), issued on Sep. 24, 1991, discloses a system for superimposing color characters on an input video signal. In the system, a first Sync Separator separates horizontal sync pulses from the input video signal. These horizontal sync pulses are used by a Phase Lock Loop (PLL) circuit to generate a reference clock signal (P1) that is locked to the horizontal sync pulses of the input video signal. A second Sync Separator, a Timing Generator, a Burst Gate, and a second PLL circuit generate an oscillation output signal that is phase locked to a burst signal of the input video signal. The reference clock signal and the oscillation output signal are used to synchronize a generated character signal with the input video signal. A Changeover Signal Generator generates changeover control signals to either deliver just the input video signal or the input video signal superimposed with color characters to an output of the system.

Color in, for example, an National Television Systems Committee (NTSC) video signal is conveyed in a color subcarrier on the video signal, while brightness is conveyed through the main signal. The NTSC video signal is an analog signal wherein the color information is contained in the phase and amplitude of the color subcarrier whose reference is contained in a short color burst at the beginning of video information for each line in the television picture. The color burst allows the television receiver to look at the burst, which is a small snapshot of the color subcarrier, and lock onto the color subcarrier. Present Cable Television (CATV) Converter boxes are analog converters which provide an On Screen Display (OSD) as for example, the number of the presently tuned television channel being viewed, etc. It is necessary to look at the color burst to overlay the right subcarrier phase onto the characters being generated for the OSD since the phase of the color subcarrier directly imparts information as to the color of the character.

In the near future it is expected that Cable television (CATV) companies will be transmitting digital TV signal possibly mixed with analog TV signals. With digital TV transmissions, "1's" and "0's" are transmitted rather than an analog video signal. Digital TV transmissions provide clearer pictures since interference is avoided. To be compatible with current TV receivers, the digital TV signal has to be converted to a standard analog TV signal. At an exemplary digital Cable TV Converter, the color subcarrier is locally generated and used to generate an analog TV signal. More particularly, the Cable TV Converter comprises a Video Encoder that receives the digital TV signal which does not have color subcarrier information in it. Instead, the digital TV signal is completely in a component form including, for example, Red, Green, and Blue color information. Therefore, a Digital Video Encoder in a digital terminal or in future Cable TV Converter must recreate the color subcarrier in order for the TV receiver to reproduce the desired picture. That same locally generated color subcarrier can be easily used to process digital character information and precisely overlay the digital characters on the digitally received TV signals.

A problem is that the digital Video Encoder used with the digital TV signals is not locked onto analog TV signals that are also received on the same input cable line. Therefore, it is desirable to provide a digital TV receiving device wherein a Digital Video Encoder is usable with received analog TV signals, and has the ability to overlay digital characters with proper color on the analog TV signals without causing On Screen Display jitter.

SUMMARY OF THE INVENTION

The present invention is directed to a system for overlaying digital characters on an analog video source signal that includes a predetermined color subcarrier. The system comprises digital character generating means, a digital video encoder, and switching means. The digital character generating means detects timing of pixel locations in the analog video source signal, and generates digital character signals that are to be overlaid in predetermined pixel locations of the analog video source signal. The digital video encoder is responsive to the predetermined color subcarrier signal for generating a separate color subcarrier signal which is locked to the predetermined color subcarrier signal. The digital video encoder converts the digital character signals from the digital character generating means into an analog video output signal that includes the color subcarrier generated in the digital video encoder. The switching means switches to an output of the system (a) the analog video source signal during time periods when pixels of the digital character are not to be overlaid on the analog video source signal, and (b) the analog video output signal from the digital video encoder during time periods when pixels of the digital character are to be overlaid on the analog video source signal.

Viewed from still another aspect, the present invention is directed to a system for overlaying digital characters on an analog video source signal that includes a predetermined color subcarrier. The system comprises subcarrier generating means, digital character generating means, a digital video encoder comprising a subcarrier direct digital synthesis (DDS) means, a digital component video to analog video converting means, and switching means. The subcarrier generating means separately generates a color subcarrier signal which is locked to the color subcarrier of the analog video source signal. The digital character generating means detects timing of pixel locations in the analog video source signal, and generates digital character signals that are to be overlaid in predetermined pixel locations of the analog video source signal. The subcarrier direct digital synthesis (DDS) means of the digital video encoder is responsive to the color subcarrier signals from the subcarrier generating means for separately generating a color subcarrier output signal which locked to, and has a substantially same frequency as, the color subcarrier generated by the subcarrier generating means. The digital component video to analog video converting means of the digital video encoder which is responsive to each of (a) the color subcarrier output signal from the subcarrier DDS means, and (b) the digital character generating means for converting the digital character signals from the digital character generating means into the analog video output signal that includes the color subcarrier generated in the subcarrier DDS means for the character to be overlaid onto the analog video signal. The analog video output signal includes the color subcarrier generated in the subcarrier DDS means for the character to be overlaid on the analog video source signal. The switching means switches to an output of the system (a) the analog video source signal during time periods when pixels of the digital character are not to be overlaid on the analog video source signal, and (b) the analog video output signal from the digital component video encoder during time periods when pixels of the digital character are to be overlaid on the analog video source signal.

Viewed from still another aspect, the present invention is directed to a method of overlaying digital characters on an analog video source signal that includes a predetermined color subcarrier. In a first step, timing of pixel locations in the analog video source signal in a digital character generating means is detected, and an output signal is generated representative of such timing. In a second step, digital character signals are generated that are to be overlaid in predetermined pixel locations of the analog video source signal in the digital character generating means in response to the output signal from the second step. In a third step, a separate color subcarrier signal is generated in a digital video encoder which is locked to the color subcarrier signal generated by the subcarrier generating means in the first step. In a fourth step, the digital character signals from the digital character generating means in the third step are converted into an analog video output signal that includes the color subcarrier generated in the digital video encoder in the fourth step. In a fifth step, a switching means switches to an output of the system (i) the analog video source signal during time periods when pixels of the digital character are not to be overlaid on the analog video source signal, and (ii) the analog video output signal from the digital video encoder during time periods when pixels of the digital character are to be overlaid on the analog video source signal by a switching means.

The invention will be better understood from the following more detailed description taken with the accompanying drawings and claims.

DETAILED DESCRIPTION

It is to be understood that corresponding elements having the same function in the several views of the drawings are provided with the same designation numbers.

Figure 1:
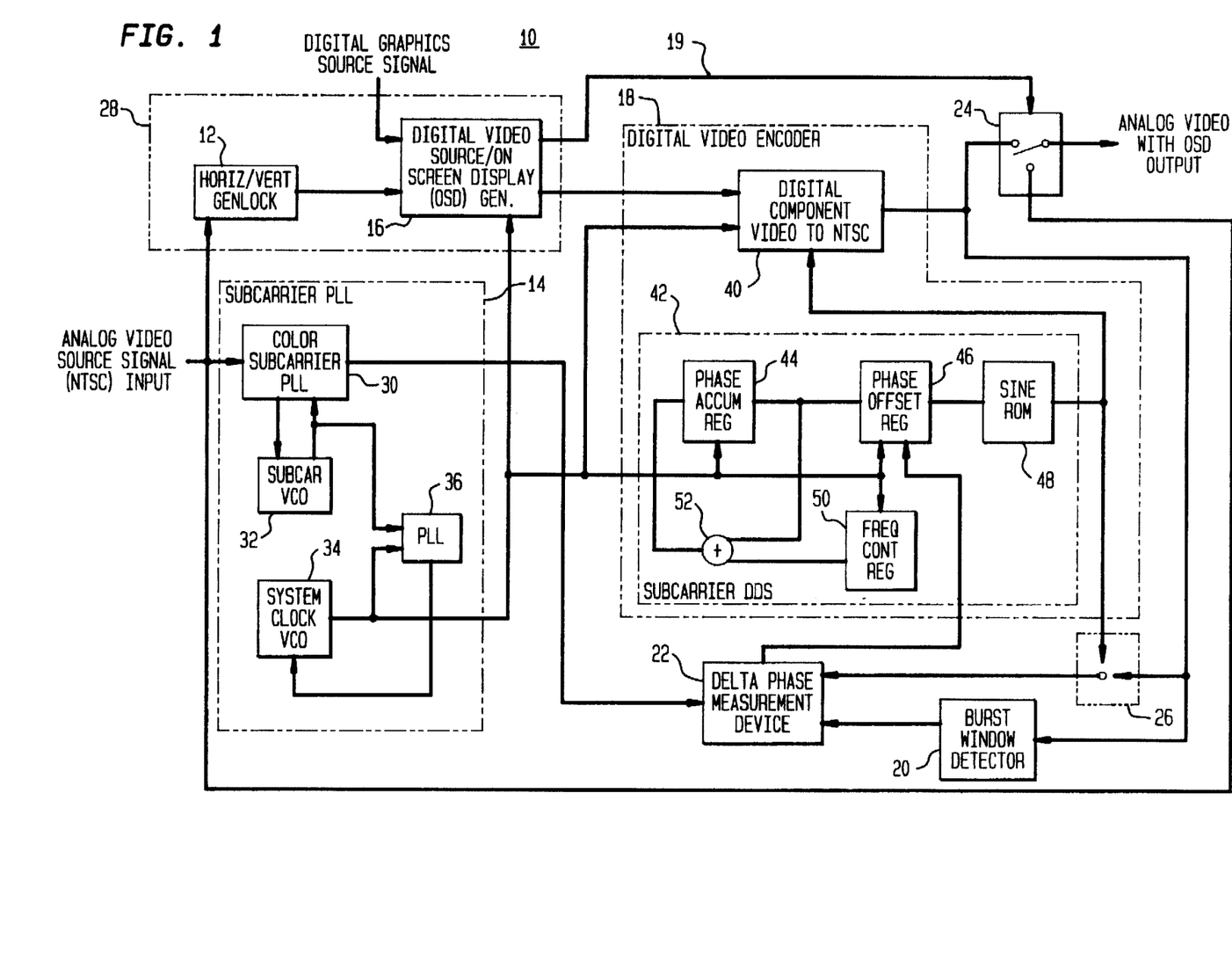
FIG. 1 is a block diagram of a system for overlaying digitally generated graphics over an input analog video source signal in accordance with a first embodiment of the present invention.

Referring now to FIG. 1, there is shown a block diagram of a system 10 for overlaying digitally generated graphics over an input analog video source signal in accordance with a first embodiment of the present invention. The system 10 comprises a horizontal/vertical (Horiz./Vert.) Genlock device 12, a subcarrier Phase Lock Loop (PLL) 14 (shown within a dashed line rectangle), a digital video source/On Screen Display (OSD) generator 16, a digital video encoder 18 (shown within a dashed line rectangle), an optional burst window detector 20, a delta phase measurement device 22, and a switching means 24. The input analog video source signal is, for example, a National Television System Committee (NTSC) video standard signal which is provided as an input to each of the horizontal/vertical Genlock device 12, the subcarrier PLL 14, and the switching means 24. The horizontal/vertical Genlock device 12 and the digital video source/OSD generator 16 are components of a Digital Character Generating means 28 (shown within a dashed line rectangle). The horizontal/vertical Genlock device 12 has an output which is coupled to a first input of the digital video source/OSD generator 16. A digital graphics source signal comprising characters to be overlaid onto the input analog video source signal is provided as a second input to the digital video source/OSD generator 16 from a remote digital graphics source (not shown). A first output of the digital video source/OSD generator 16 is coupled to the switching means 24 for providing control signals that control the switching position of the switching means 24 between the input analog video source signal and an analog video output signal from the digital video encoder 18. A second output of the digital video source/OSD generator 16 is to coupled to an input of the digital video encoder 18 for delivering signals representing characters to be overlaid on the input video source signal.

The subcarrier PLL 14 (shown within a dashed line rectangle) is a subcarrier and system clock generating means that comprises a color subcarrier PLL 30, a subcarrier Voltage Controlled Oscillator (SUBCAR. VCO) 32, a system clock VCO 34, and a PLL 36. The subcarrier VCO 32 generates a color subcarrier that is a multiple (e.g., 4) of the color subcarrier (e.g., 3.58 MHz for a NTSC video color signal) of the input analog video source signal which is delivered as a first input to the color subcarrier PLL 30 and to a first input of the PLL 36. It is assumed hereinafter that the output frequency of the subcarrier VCO 32 is 14.318 MHz, which is 4 times the value of the 3.58 color subcarrier used in the NTSC analog video source signal. It is to be understood that the output frequency of the subcarrier VCO 32 can be an other desirable value.

Figure 2:
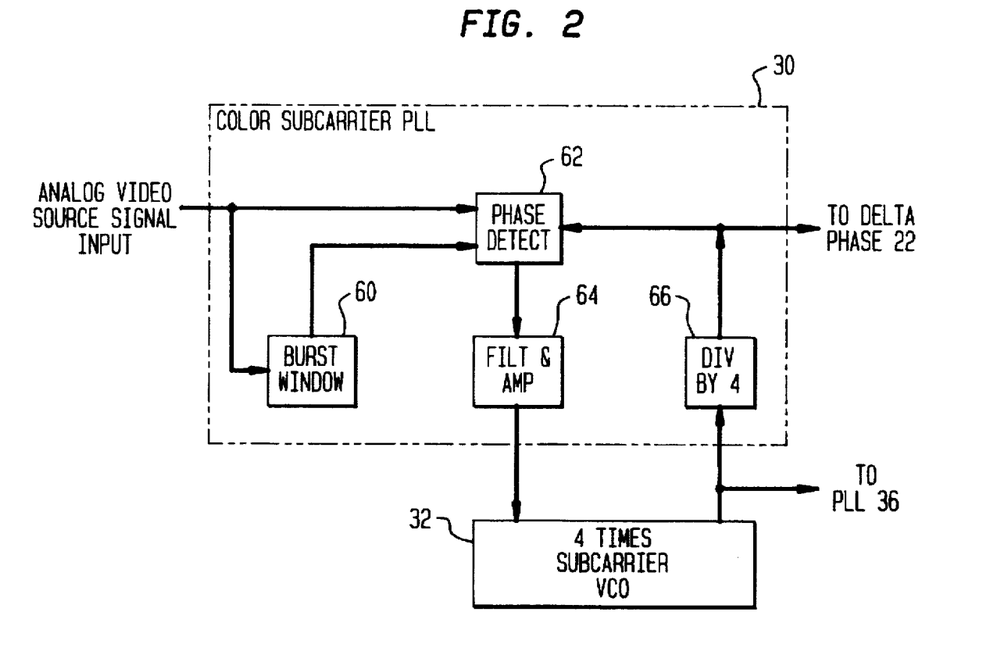
FIG. 2 is a block diagram of an exemplary Subcarrier Phase Lock Loop (PLL) used with a Subcarrier Voltage Controlled Oscillator (VCO) of the system of FIG. 1.

Referring now to FIG. 2, there is shown a block diagram of an exemplary arrangement of the Color Subcarrier PLL 30 that is used with the Subcarrier VCO 32 (4 TIMES SUBCARRIER VCO) generating a 14.318 MHz subcarrier in the subcarrier PLL 14 of FIG. 1. The Color Subcarrier PLL 30 comprises a burst window 60, a phase detector (PHASE DETECT) 62, a filter and amplifier (FILT. & AMP.) 64, and a divide-by-4 circuit (DIV BY 4) 66. As stated hereinabove, the color subcarrier of the analog video source signal has a frequency of 3.58 MHz, and it is hereinafter assumed that the subcarrier VCO 32 generates a continuous subcarrier at a frequency of 14.318 MHz which is four times that of the 3.58 MHz color subcarrier of the analog video source signal. The analog video source signal is received at an input of the burst window 60 and at a first input of the phase detector 62. The divide-by-4 circuit 66 receives the 14.318 MHz output signal from the 4 times subcarrier VCO 32 and divides the 14.318 MHz signal by four to generate an output signal at 3.58 MHz for transmission to a second input of the phase detector 62 and to the delta phase measurement device 22 (shown only in FIG. 1). The phase detector 62 compares the phase of the color subcarrier (3.58 MHz) of the analog video source signal with the phase of the output signal (3.58 MHz) generated by the divide-by-4 circuit 66 to generate a feedback control signal. The feedback control signal, which is generated at an output of the phase detector 62, is coupled to an input of the filter and amplifier 64 which filters and amplifies it. An output of the filter and amplifier 64 is coupled to an input to the 4 times subcarrier VCO 32 to lock the phase and frequency of the color subcarrier output signal that is generated by the combination of the subcarrier VCO 32 and the divide-by-4 circuit 66 to the color subcarrier of the analog video source signal.

It is to be understood that the color subcarrier in the analog video source signal is conveyed in a color burst signal which occupies only a small portion of each line signal. Since the color subcarrier is not a continuous signal in the analog video source signal, the phase detector 62 cannot continuously compare the phases or two signals. The burst window 60 functions to detect each color burst signal and to provide an "enable" control signal to the phase detector 62 for the window time period when the color burst signal in the analog video source signal is received. The phase detector 62 is responsive to the "enable" control signal so that the phase detector 62 is only active during a color burst window time period. More particularly, the output signal from the phase detector 62 is essentially disconnected from the filter and amplifier 64 during time periods when a color burst signal is absent. Essentially, the phase detector 62 provides a high impedance and is effectively electrically disconnected from, and does not influence, the filter and amplifier 64 when an "enable" control signal is absent.

Figure 3:
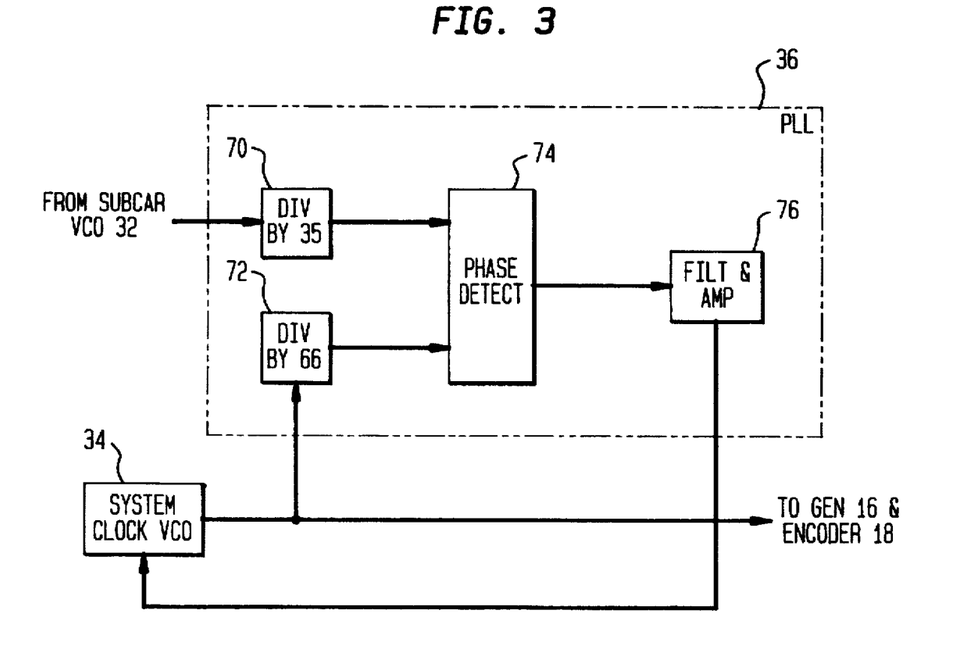
FIG. 3 is a block diagram of an exemplary PLL used with a System Clock VCO of the system of FIG. 1.

Referring now to FIG. 3, there is shown a block diagram of an exemplary arrangement of the PLL 36 used with a System Clock VCO 34 in the subcarrier PLL 14 of FIG. 1. The PLL 36 comprises a divide-by-35 circuit 70, and a divide-by-66 circuit 72, a phase detector (PHASE DETECT) 74, and a filter and amplifier (FILT & AMP) 76. The system clock VCO 34 generates a system clock output signal at a predetermined frequency, which is hereinafter assumed to be 27 MHz, for use by the components of the system 10, and is provided as an input to the divide-by-66 circuit 72 of the PLL 36. The divide-by-66 circuit 72 receives the system clock signal at a frequency of 27 MHz, divides the 27 MHz signal by the numerical constant of 66. The divide-by-35 circuit 70 receives the subcarrier signal at a second predetermined frequency, which is hereinafter assumed to be 14.318 MHz, generated by the subcarrier VCO 32 (shown in FIGS. 1 and 2), and divides the 14.318 MHz signal by the numerical constant of 35. The resultant output signals from the divide-by-35 circuit 70 and the divideby-66 circuit 72 are at a substantially equal frequency, and are provided as separate inputs to the phase detector 74. The phase detector 74 compares the phases of these substantially equal frequency subcarrier and system clock signals, and provides at an output thereof control signals back to the system clock VCO 34 through the filter and amplifier 76 to maintain the frequency of the system clock output signal of the system clock VCO 34 at substantially the predetermined frequency (e.g., 27 MHz). The filter and amplifier 76 functions to block any unwanted signals, and amplifies the resultant control signal to a predetermined level. By the phase detector 74 comparing the phases of the subcarrier generated by the subcarrier VCO 32, which is locked onto the color subcarrier of the analog input video source signal and adjusted by the divide-by-35 circuit 70, and the system clock VCO 34 output as adjusted by the divide-by-66 circuit 72, the output frequency of the system clock VCO 34 is also essentially locked onto the color subcarrier of the analog input video source signal. The output from the system clock 34 is coupled to inputs of the digital video source/On Screen Display (OSD) generator 16 and the digital video encoder 18.

Returning now to FIG. 1, the Horizontal/Vertical Genlock 12 of the digital character generating means 28 receives the analog video source signal and detects therefrom horizontal and vertical timing of pixel location or information in the analog video source signal. The horizontal timing is extracted from the horizontal sync pulses found in the analog video source signal, and the vertical timing is extracted from the vertical sync pulses of the analog video source signal. Vertical timing is necessary to indicate the occurrence of information relating to a dot or pixel position in a vertical direction of a picture on a viewing screen (note shown) that reproduces the analog video source signal and the overlaid characters. The horizontal timing is necessary to indicate the occurrence of information relating to a dot or pixel position in a horizontal direction of a picture on a viewing screen (not shown) that reproduces the analog video source signal and the overlaid characters. Together the horizontal and vertical timing define the exact dot or pixel position on the viewing screen. The horizontal and vertical timing is necessary for the Digital Video Source/OSD Generator 16 to output a correctly timed digital video output pixel signal that overlays a dot or pixel on the viewing screen. The Horizontal/Vertical Genlock device 12 can comprise any well know Horizontal/Vertical Genlock device such as, for example, a National Semiconductor model LM1881 Genlock device.

The Digital Video Source/OSD Generator 16 receives at a first input thereof the output signals from the Horizontal/Vertical Genlock device 12 defining the horizontal and vertical timing at a first input. Still further, the Digital Video Source/OSD Generator 16 receives at a second input thereof a digital graphics source signal from a digital graphics source (not shown) containing information about characters to be overlaid on the analog video source signal. The Digital Video Source/OSD Generator 16 functions to control the dot or pixel display of the On Screen Display (OSD). More particularly, the Digital Video Source/OSD Generator 16 keeps track of the present dot or pixel position on the viewing screen by monitoring the horizontal and vertical timing from the Horizontal/Vertical Genlock 12. The Digital Video Source/OSD Generator 16 comprises a list or map (not shown) of the OSD information to be outputted along with a precise corresponding viewing screen pixel or dot position.

In a digital mode (not shown) where a digital video source signal is received instead of the analog video source signal as is shown in FIG. 1, a Digital Video Source/OSD Generator performs framing of the received digital video source signal and replaces digital video source signal data with OSD character data at certain dot or pixel positions. The digital video source signal data with the overlaid digital OSD character data is then sent through a Digital Video Encoder which independently generates a color subcarrier that is not locked to data of the digital video source signal. The Digital Video Encoder converts the digital video source signal data with the overlaid digital OSD character data into an analog NTSC standard video output signal that includes the color subcarrier bursts generated in the Digital Video Encoder for display on a standard television receiver screen. The digital mode is a straight forward mode and is of no concern to the present system 10.

However, in an analog mode where an analog video source signal is received, as is shown in FIG. 1, the Digital Video Source/OSD Generator 16 receives no analog video source data except the horizontal and vertical timing from the Horizontal/Vertical Genlock 12. The Digital Video Source/OSD Generator 16 generates a digital video data stream that only includes desired character OSD information that is timed to be in correct predetermined pixel positions on the viewing screen (not shown). Still further, the Digital Video Source/OSD Generator 16 transmits at a first output thereof control signals for controlling the switching means 24 since the Digital Video Source/OSD Generator 16 has the necessary information regarding whether each dot or pixel of the viewing screen should display the analog source video source signal information or the character OSD information. The Digital Video Source/OSD Generator 16 can comprise any suitable arrangement as, for example, well known industry implementations using basic logic designs.

The Digital Video Encoder 18 (shown within a dashed line rectangle) comprises a digital component video to NTSC converter 40 and a subcarrier direct digital synthesis (DDS) circuit 42. The digital component video to NTSC converter 40 functions to convert a digital component video signal representing the character information to be overlaid from the Digital Video Source/OSD Generator 16 into an NTSC analog video output signal including a color subcarrier generated in the subcarrier DDS circuit 42.

The subcarrier DDS circuit 42 comprises a phase accumulating register 44, a phase offset register 46, a sine ROM 48, a frequency control register 50, and an adder 52. Each of the phase accumulating register 44, the phase offset register 46, and the frequency control register 50 are clocked at the system clock rate generated by the system clock VCO 34 in the subcarrier PLL 14. In general, the frequency control register 50 of the subcarrier DDS 42 is loaded with a frequency control number which is used to generate a nominal subcarrier frequency. Since the system clock used within the subcarrier DDS 42 is obtained from the system clock VCO 34 of the subcarrier PLL 14 and is locked to the color subcarrier of the analog video source signal, the substantially same frequency (3.58 MHz) of the color subcarrier is produced by the subcarrier DDS 42 when a predetermined frequency control number is used.

In the subcarrier DDS 42, the frequency control register 50 is provided with, and stores, a predetermined frequency control data word that determines the frequency which is produced by the subcarrier DDS 42. More particularly, a first frequency is obtained from the subcarrier DDS 42 by placing a first K-bit data word into the frequency control register 50, and a second frequency is obtained from the subcarrier DDS 42 by placing a second K-bit data word into the frequency control register 50. The K-bit data word from the frequency control register 50 is provided as a first input to the adder 52. The adder 52 also receives a second input from the output of the phase accumulating register 44. The phase accumulating register 44 receives an output signal from the adder 52 and adds the value of adder output signal to a phase value outputted immediately prior thereto. More particularly, the phase accumulating register 44 outputs and retains a particular phase value (e.g. "0") which is supplied to the adder 52. Assuming that the frequency control data word from the frequency control register 50 has a constant predetermined value of "2" and the output of the phase accumulating register 44 is "0", then during a first system clock period the output of the adder 52 has a value of 0+2=2 that is transmitted to the phase accumulating register 44. The phase accumulating register 44 receives the value "2" from the adder 52 and effectively adds that value to the immediately previous output value of "0" to generate an new output value of "2". During a next system clock period, the adder 52 adds the data word having a value of "2" from the frequency control register 50 to the output value of "2" generated in the phase accumulating register 44 to produce a value of "4" that is transmitted to the phase accumulating register 44. As a result, the phase accumulating register 44 receives the value "4" from the adder 52 and effectively adds that value to the immediately previous output value of "2" to generate an output value of "6". This sequence continues until a predetermined maximum value for the output from the phase accumulating register is reached, at which time the sequence starts over again.

An output signal from the phase accumulating register 44 is also provided as an input to the phase offset register 46. Still further, the phase offset register 46 receives at an output thereof an output from the delta phase measurement device 22. The phase offset register 46 uses the output from each of the phase accumulating register 44 and the delta phase measurement device 22 to generate data at an output thereof which is coupled to an input of the sine ROM 48. The sine ROM 48 uses the data from the phase offset register 46 to generate a sine wave at the correct frequency (3.58 MHz) of the color subcarrier from the subcarrier DDS 42. The frequency (Fout) generated by the sine ROM 48 is determined from the equation $$Fout = (Fc)(K)/2^n, \qquad (1)$$

where Fc is the frequency of the system clock, K is the value of the frequency control data word, and $2^n$ is a size in locations of the sine ROM 48. The digital video encoder 18 can comprise any suitable arrangement as, for example, the Raytheon model TMC22090 and Plessey model VP535 encoders which are then modified to be locked to the color subcarrier of the input analog video source signal as shown in FIG. 1.

The delta phase measurement device 22 receives a signal at a frequency of 3.58 MHz from the color subcarrier PLL 14 which is locked onto the color subcarrier of the analog video source signal at a first input. A second input to the delta phase measurement device 22 is obtained from either one of the output of the sine ROM 48 or the output from the digital component video to NTSC converter 40. This optional arrangement of the second input to the delta phase measurement device 22 is illustrated within a dashed line rectangular block 26. More particularly, the output signal from the sine ROM 48 is a continuous signal at the 3.58 MHz color subcarrier frequency. When the sine ROM 48 is coupled to the second input of the delta phase measurement device 22, this and the color subcarrier from the subcarrier PLL 14 are the only two inputs required since the first and second input signals are continuous signals at substantially the same frequency. However, when the output from the digital component video to NTSC converter 40 is provided as a second input to the delta phase measurement device 22, a third input to the delta phase measurement device 22 is required through the burst window detector 20. The reason for this is that the output from the digital component video to NTSC converter 40 is an NTSC video signal and not a continuous color subcarrier burst. Therefore, the burst window detector 20 provides an enable signal to the delta phase measurement device so that a comparison of the continuous subcarrier signal from the subcarrier PLL 14 is made when the color subcarrier burst signal in the output signal of the digital component video to NTSC converter 40 is present.

In prior art implementations for digital channels, the subcarrier DDS 42 is loaded with the frequency control data word from the frequency control register 42 which is used to generate the nominal subcarrier frequency from the sine ROM 48. Although the system clock is locked to the input digital line signal, a subcarrier frequency is generated which is not in any way frequency or phase locked to the analog source video subcarrier. As a result the OSD graphic information overlaid onto the line signal has bad drifting and annoying color which is totally unacceptable.

In the system 10, the subcarrier DDS 42 is still loaded with the frequency control data word from the frequency control register 42 which is used to generate the nominal subcarrier frequency from the sine ROM 48. The advantage of the present invention is that the system clock signal from the system clock VCO 34 is locked to the frequency of the color subcarrier of the analog video source signal, which in turn causes the digital video encoder 18 to generate a correct frequency of the color subcarrier. The phase of the Digital Video Encoder color subcarrier is not necessarily matched to the phase of the color subcarrier of the analog video source signal. Although a phase difference and some small frequency difference may exist due to the resolution of the subcarrier DDS 42, this is accounted for by the phase offset register 46 in response to the output signal from the delta phase measurement device 22.

The switching means 24 is controlled or enabled by the digital video source/OSD generator 16 via a lead 19 to direct the analog video source signal to the output of the system 10 unless a pixel or dot for a character is to be entered or overlaid onto the analog video source signal. When a pixel or dot of a character is to be entered or overlaid onto the analog video source signal, the switching means 24 is enabled by the digital video source/OSD generator 16 to propagate the output analog character video signal from the digital component video to NTSC converter 40 and to the output of the system 10.

Figure 4:
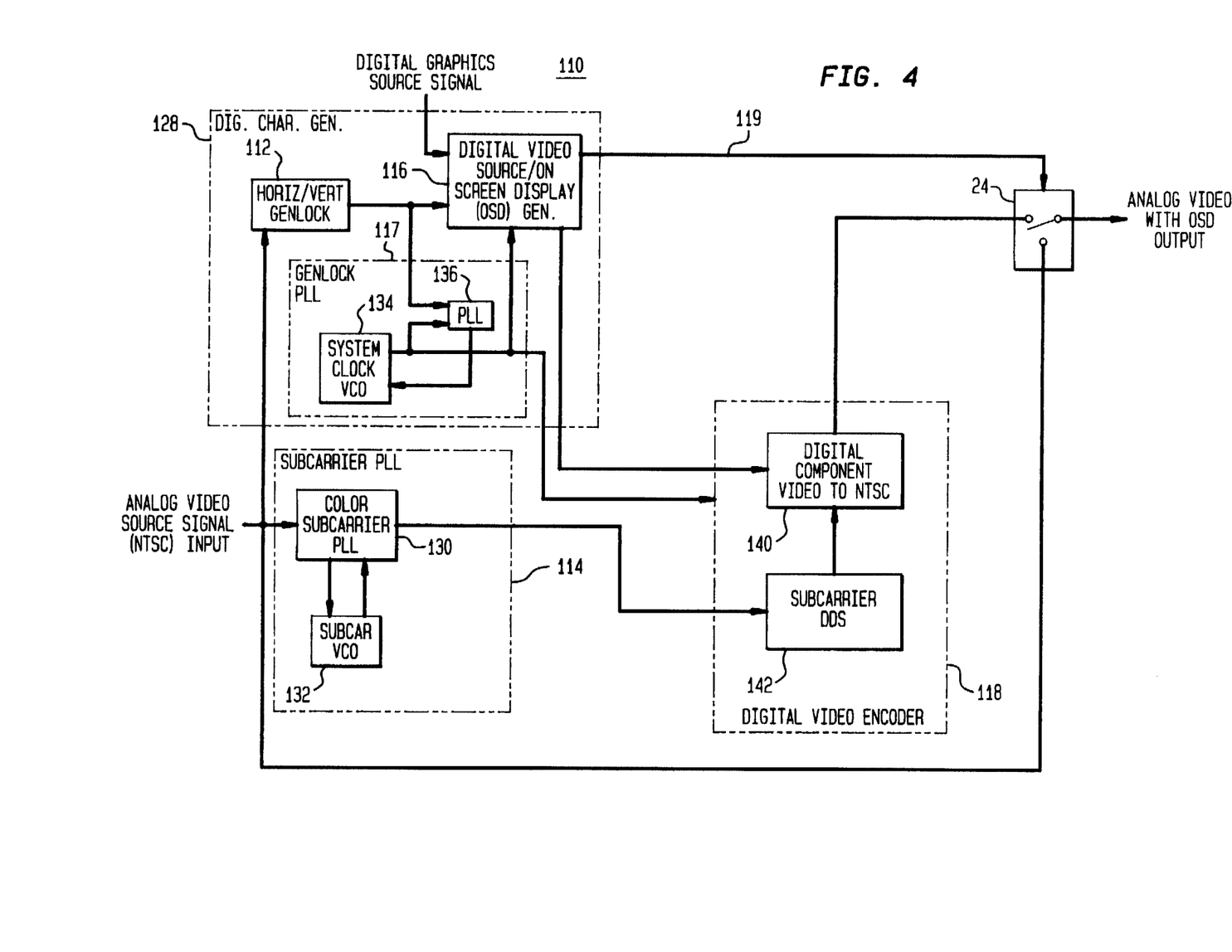
FIG. 4 is a block diagram of a system for overlaying digitally generated graphics over an input analog video source signal in accordance with a second embodiment of the present invention.

Referring now to FIG. 4, there is shown a block diagram of a system 110 for overlaying digitally generated graphics over an input analog video source signal in accordance with a second embodiment of the present invention. The system 110 comprises a a Digital Character Generating means (DIG. CHAR. GEN.) 128 (shown within a dashed line rectangle), a subcarrier Phase Lock Loop (PLL) 114 (shown within a dashed line rectangle), a digital video encoder 118 (shown within a dashed line rectangle), and a switching means 24.

The Digital Character Generating means 128 comprises a horizontal/vertical Genlock device 112, a digital video source/On Screen Display (OSD) generator 116, and a Genlock phase locked loop (PLL) 117. The input analog video source signal is, for example, a National Television System Committee (NTSC) video standard signal which is coupled to an input to each of the horizontal/vertical Genlock device 112, the subcarrier PLL 114, and the switching means 24. The horizontal/vertical Genlock device 112 has an output which is coupled to a first input of the digital video source/OSD generator 116 and to a first input of the PLL 136 of the Genlock PLL 117. The Genlock PLL 117 comprises a system clock voltage controlled oscillator (SYSTEM CLOCK VCO) 134 and a PLL 136. An output of the system clock VCO 134 is coupled to a second input of the PLL 136, the digital video source/OSD generator 116, and the Digital Video Encoder 118 for use as a main clock for all elements thereof. An output from the PLL 136 is coupled to an input to the system clock VCO 134.

The Horizontal/Vertical Genlock 112 of the Digital Character Generating means 128 functions as described for Horizontal/Vertical Genlock 12 of system 10 of FIG. 1, and receives the analog video source signal and detects therefrom horizontal and vertical timing of pixel location or information in the analog video source signal. The horizontal timing is extracted from the horizontal sync pulses found in the analog video source signal, and the vertical timing is extracted from the vertical sync pulses of the analog video source signal. Vertical timing is necessary to indicate the occurrence of information relating to a dot or pixel position in a vertical direction of a picture on a viewing screen (note shown) that reproduces the analog video source signal and the overlaid characters. The horizontal timing is necessary to indicate the occurrence of information relating to a dot or pixel position in a horizontal direction of a picture on a viewing screen (not shown) that reproduces the analog video source signal and the overlaid characters. Together the horizontal and vertical timing define the exact dot or pixel position on the viewing screen. The horizontal and vertical timing is necessary for the Digital Video Source/OSD Generator 116 to output a correctly timed digital video output pixel signal that overlays a dot or pixel on the viewing screen. The Horizontal/Vertical Genlock device 112 can comprise any well know Horizontal/Vertical Genlock device such as, for example, a National Semiconductor model LM1881 Genlock device. Therefore, the output from the system clock VCO 134 of the Genlock PLL 117 is locked to the analog line pixel rate of the received analog video source signal.

The Digital Video Source/OSD Generator 116 receives at a first input thereof the output signals from the Horizontal/Vertical Genlock device 112 defining the horizontal and vertical timing at a first input and the system clock VCO 134 from the Genlock PLL 117 which is locked to the analog line pixel rate at a second input. Still further, the Digital Video Source/OSD Generator 116 receives at a third input thereof a digital graphics source signal from a digital graphics source (not shown) containing information about characters to be overlaid on the analog video source signal. The Digital Video Source/OSD Generator 116 functions to control the dot or pixel display of the On Screen Display (OSD) thereof.

More particularly, the Digital Video Source/OSD Generator 116 keeps track of the present dot or pixel position on the viewing screen by monitoring the horizontal and vertical timing from the Horizontal/Vertical Genlock 12 and using the output clock signal from the system clock VCO 134. The Digital Video Source/OSD Generator 116 corresponds to the Digital Video Source/OSD Generator 16 of the system 10 of FIG. 1 and comprises a list or map (not shown) of the OSD information to be outputted along with a precise corresponding viewing screen pixel or dot position.

A first output of the digital video source/OSD generator 116 is coupled to the switching means 24 for providing control signals that control the switching position of the switching means 24 between the analog video source signal and an analog video output signal from the digital video encoder 118. A second output of the digital video source/ OSD generator 116 is coupled to an input of the digital video encoder 118 for delivering signals representing characters to be overlaid on the input video source signal.

The subcarrier PLL 114 (shown within a dashed line rectangle) is a subcarrier clock generating means that comprises a color subcarrier PLL 130, and a subcarrier Voltage Controlled Oscillator (SUBCAR VCO) 132. The subcarrier VCO 132 corresponds to the subcarrier VCO 32 of the system 10 of FIG. 1, and generates a color subcarrier that is a multiple (e.g., 4) of the color subcarrier (e.g., 3.58 MHz for a NTSC video color signal) of the input analog video source signal which is delivered as a first input to the color subcarrier PLL 130. It is assumed hereinafter that the output frequency of the subcarrier VCO 132 is 14.318 MHz, which is 4 times the value of the 3.58 color subcarrier used in the NTSC analog video source signal. It is to be understood that the output frequency of the subcarrier VCO 132 can be any other desirable value.

Figure 5:
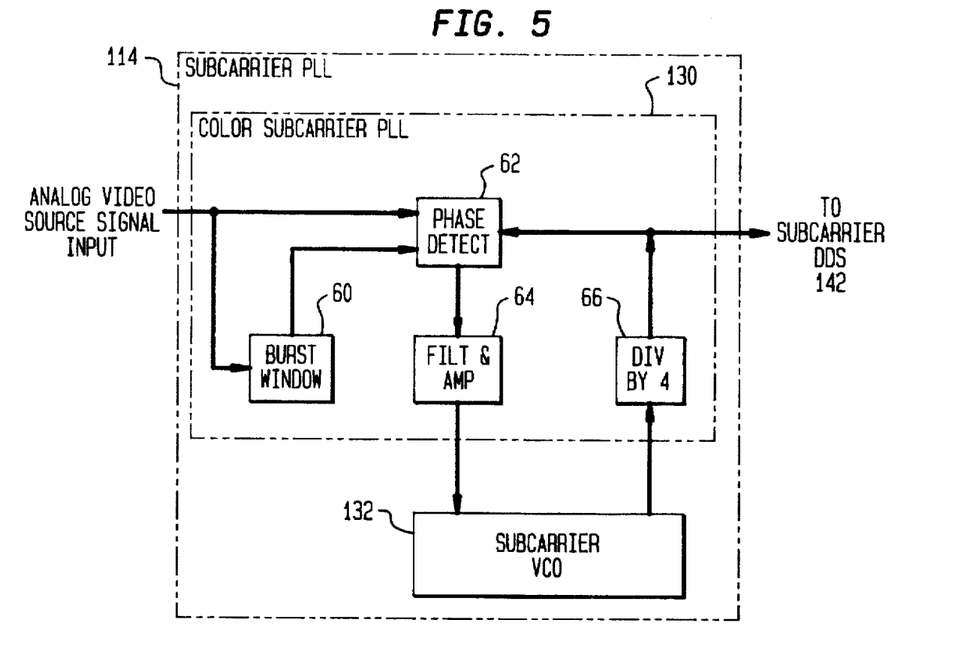
FIG. 5 is a block diagram of an exemplary Subcarrier Phase Lock Loop (PLL) used with a Subcarrier Voltage Controlled Oscillator (VCO) of the system of FIG. 4.

Referring now to FIG. 5, there is shown a block diagram of an exemplary arrangement of the subcarrier phase lock loop (PLL) 114 of FIG. 4. The PLL 114 comprises a Color Subcarrier PLL 130 that is used with a Subcarrier VCO 132 (SUBCARRIER VCO) generating a 14.318 MHz subcarrier in the subcarrier PLL 114. The Color Subcarrier PLL 130 and the Color Subcarrier PLL 30 of the system 10 of FIG. 1 are essentially identical. The Color Subcarrier PLL 130 comprises a burst window 60, a phase detector (PHASE DETECT) 62, a filter and amplifier (FILT & AMP) 64, and a divide-by-4 circuit (DIV BY 4) 66. As stated hereinabove, the color subcarrier of the analog video source signal has a frequency of 3.58 MHz, and it is hereinafter assumed that the subcarrier VCO 132 generates a continuous subcarrier at a frequency of 14.318 MHz which is four times that of the 3.58 MHz color subcarrier of the analog video source signal. The analog video source signal is coupled to an input of the burst window 60 and to a first input of the phase detector 62. An output of the subcarrier VCO 132 is coupled to an input of the divide-by-4 circuit 66. Thus, the divide-by-4 circuit 66 receives the 14.318 MHz output signal from the subcarrier VCO 132 and divides the 14.318 MHz signal by four to generate an output signal at 3.58 MHz which is coupled to a second input of the phase detector 62 and to the Subcarrier DDS 142 of the Digital Video Encoder 116 (shown only in FIG. 4). The phase detector 62 compares the phase of the color subcarrier (3.58 MHz) of the analog video source signal with the phase of the output signal (3.58 MHz) generated by the divide-by-4 circuit 66 to generate a feedback control signal. The feedback control signal, which is generated at an output of the phase detector 62, is coupled to an input of the filter and amplifier 64 which filters and amplifies it. An output of the filter and amplifier 64 is coupled to an input to the subcarrier VCO 132 to lock the phase and frequency of the color subcarrier output signal that is generated by the combination of the subcarrier VCO 132 and the divide-by-4 circuit 66 to the color subcarrier of the analog video source signal.

Figure 6:
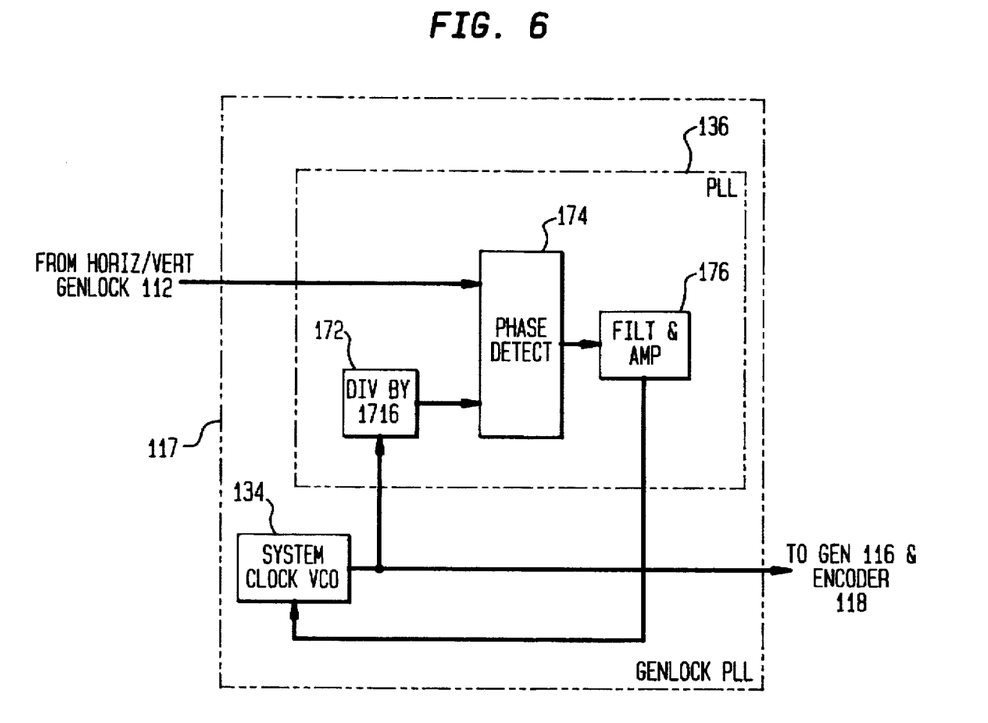
FIG. 6 is a block diagram of an exemplary PLL used with a System Clock VCO of the system of FIG. 4.

Referring now to FIG. 6, there is shown a block diagram of an exemplary arrangement of the PLL 136 used with a System Clock VCO 134 in the subcarrier PLL 114 of FIG. 4. The PLL 136 comprises a divide-by-1716 circuit 172, a phase detector (PHASE DETECT) 174, and a filter and amplifier (FILT & AMP) 176. The system clock VCO 134 generates a system clock output signal at a predetermined frequency which is used by the Digital Video Source OSD Generator 116 and the Digital Video Encoder 118, and is coupled to an input to the divide-by-1716 circuit 172 of the PLL 136. The divide-by-1716 circuit 172 receives the system clock signal at an input thereof and divides the signal by the numerical constant of 1716. The resultant output signal from the divide-by-66 circuit 172 is coupled to a first input of the phase detector 174. A first input of the phase detector 174 is coupled to the Horizontal/Vertical Genlock device 112. The received input signal from the Horizontal/Vertical Genlock 112 and the output of the Divide-By-1716 circuit 172 are at a substantially equal frequency, and are provided as separate inputs to the phase detector 174. The phase detector 174 compares the phases of these substantially equal Genlock 112 and system clock signals, and provides at an output thereof control signals back which are coupled back to the system clock VCO 134 through the filter and amplifier 176 to maintain the frequency of the system clock output signal of the system clock VCO 134 at substantially the predetermined frequency. The filter and amplifier 176 functions to block any unwanted signals, and amplifies the resultant control signal at an output thereof which is coupled to an input of the system clock VCO 134 to a predetermined level. The output frequency of the system clock VCO 134 is also essentially locked onto the pixel rate of the analog input video source signal. This occures because the phase detector 174 compares the phases of the pixel timing signals generated by the Horizontal/Vertical Genlock 112, which is locked onto the pixel rate of the analog input video source signal, and the system clock VCO 134 output as adjusted by the divide-by-1716 circuit 172. The output from the system clock 134 is coupled to a second input of the digital video source/On Screen Display (OSD) generator 116 (shown in FIG. 4) and the Digital Video Encoder 118 (shown in FIG. 4).

Referring now back to FIG. 4, the Digital Video Encoder 118 (shown within a dashed line rectangle) comprises a digital component video to NTSC converter 140 and a subcarrier direct digital synthesis (DDS) circuit (SUBCARRIER DDS) 142. The digital component video to NTSC converter 140 corresponds to and functions as described hereinbefore for the digital component video to NTSC converter 40 of system 10 of FIG. 1. More particularly, digital component video to NTSC converter 140 converts a digital component video signal representing the character information to be overlaid from the Digital Video Source/OSD Generator 116 into an NTSC analog video output signal including a color subcarrier generated in the subcarrier DDS circuit 142 which is locked to the color subcarrier of the analog video source signal via the subcarrier PLL 130.

The switching means 24 corresponds to the switching means 24 of the system 10 of FIG. 1 and is controlled or enabled by the digital video source/OSD generator 116 via a lead 119 to direct the analog video source signal to the output of the system 110 unless a pixel or dot for a character is to be entered or overlaid onto the analog video source signal. When a pixel or dot of a character is to be entered or overlaid onto the analog video source signal, the switching means 24 is enabled by the digital video source/OSD generator 116 to propagate the output analog character video signal from the digital component video to NTSC converter 140 and to the output of the system 110. It is to be appreciated and understood that the specific embodiments of the invention described hereinabove are merely illustrative of the general principles of the invention. Various modifications may be made by those skilled in the art which are consistent with the principles set forth. For example, the present invention as shown in FIGS. 1–6 can be modified to operate with analog video source signals having other standards such as the Phase Alternation Line (PAL) and SECAM standards used in other parts of the world.

What is claimed is:

1. A system for overlaying digital characters on an analog video source signal that includes a predetermined color subcarrier comprising:

digital character generating means for detecting timing of pixel locations in the analog video source signal, and for generating digital character signals that are to be overlaid in predetermined pixel locations of the analog video source signal;

a digital video encoder responsive to the predetermined color subcarrier signal for generating a separate color subcarrier signal which is locked to the predetermined color subcarrier signal, and for converting the digital character signals from the digital character generating means into an analog video output signal that includes the color subcarrier generated in the digital video encoder; and switching means for switching to an output of the system (a) the analog video source signal during time periods when pixels of the digital character are not to be overlaid on the analog video source signal, and (b) the analog video output signal from the digital video encoder during time periods when pixels of the digital character are to be overlaid on the analog video source signal.

2. The system of claim 1 wherein the system further comprises subcarrier generating means for separately generating a color subcarrier signal which is locked to the predetermined color subcarrier of the analog video source signal.

3. The system of claim 2 wherein the subcarrier generating means comprises:

a first phase lock loop (PLL) comprising a voltage controlled oscillator (VCO) for separately generating a subcarrier output signal that is locked to the predetermined color subcarrier of the analog video source signal; and a second PLL comprising a voltage controlled oscillator (VCO) for separately generating a system clock signal at a predetermined frequency that is locked to the subcarrier output signal generated by the VCO of the first PLL.

4. The system of claim 3 wherein:

the subcarrier output signal generated by the VCO of the first PLL has a frequency which is a multiple of the frequency of the predetermined color subcarrier of the analog video source signal; and the first PLL further comprises a divide-by means for reducing the frequency of the subcarrier output signal generated by the VCO of the first PLL to a frequency which is substantially equal to the frequency of the predetermined color subcarrier of the analog video source signal and is the color subcarrier output signal from the subcarrier generating means.

5. The system of claim 4 wherein the second PLL further comprises:

first converting means for converting the frequency of the subcarrier output signal from the VCO of the first PLL to a predetermined color subcarrier output frequency which is used as an output signal of the first converting means;

second converting means for converting the frequency of the system clock signal from the VCO of the second PLL to a predetermined color subcarrier output frequency equal to the output signal from the first converting means which is an output signal of the second converting means; and a phase detector for comparing the phases of the output signals from the first and second converting means, and for generating an output control signal to the VCO of the second PLL for locking the system clock signal at the output of the VCO of the second PLL to the subcarrier output signal from the VCO of the first PLL.

6. The system of claim 1 wherein the digital character generating means comprises:

horizontal and vertical genlock means for detecting horizontal and vertical timing of pixel locations in the analog video source signal, and for generating an output signal indicating the horizontal and vertical timing of the pixel locations; and a digital video source/On Screen Display (OSD) generator for receiving a digital graphics source signal and the output signal from the horizontal and vertical genlock means for generating therefrom digital character signals that are to be overlaid in predetermined pixel locations of the analog video source signal.

7. The system of claim 6 wherein the digital character generating means further comprises:

a phase lock loop (PLL) comprising a voltage controlled oscillator (VCO) for separately generating a system clock signal to the digital video source/On Screen Display (OSD) generator that is locked to the timing of the pixel locations in the analog video source signal as is generated in the output signal from the horizontal and vertical genlock means.

8. The system of claim 2 wherein the digital video encoder comprises:

subcarrier direct digital synthesis (DDS) means which is responsive to the color subcarrier signal from the subcarrier generating means for separately generating a color subcarrier output signal which is locked to, and has a substantially same frequency as, the color subcarrier generated by the subcarrier generating means; and digital component video to analog video converting means which is responsive to each of (a) the color subcarrier output signal from the subcarrier (DDS) means, and (b) the digital character signals generated in the digital character generating means, for converting the digital character signals from the digital character generating means into the analog video output signal that includes the color subcarrier generated in the subcarrier DDS means for each pixel location of the character to be overlaid on the analog video source signal.

9. The system of claim 8 wherein the subcarrier direct digital synthesis (DDS) means comprises:

delta phase measurement means comprising first and second inputs for measuring phase differences between the color subcarrier output signal from the subcarrier generating means coupled to the first input, and one of the color subcarrier output signal from the subcarrier DDS means and the color subcarrier included in the analog video output signal from the digital component video to analog video converting means coupled to the second input, for generating an output control signal that is used to lock the color subcarrier output signal from the subcarrier DDS means to the color subcarrier generated by the subcarrier generating means.

10. The system of claim 9 wherein the subcarrier direct digital synthesis (DDS) means further comprises a burst window detecting device for detecting a color subcarrier burst in the output signal from the digital component video to analog video converting means for enabling the delta phase measurement means when the color subcarrier output signal from the subcarrier generating means is coupled to the first input and the analog video output signal from the digital component video to analog video converting means is coupled to the second input.

11. The system of claim 1 wherein:

the digital character generating means comprises means for generating enable control signals during time periods when pixels for a digital character are to be overlaid on the analog video source signal; and the switching means is responsive to the enable control signals for directing (a) the analog video source signal to the system output during pixel locations where a digital character is not to be overlaid on the analog video source signal, and (b) the analog video output signal from the digital video encoder to the system output during pixel locations where a digital character is to be overlaid on the analog video source signal.

12. The system of claim 1 wherein an output of the digital character generating means is coupled to an input of the switching means so as to control the switching means.

13. A system for overlaying digital characters on an analog video source signal that includes a predetermined color subcarrier comprising:

subcarrier generating means for separately generating a color subcarrier signal which is locked to the predetermined color subcarrier of the analog video source signal;

digital character generating means for detecting timing of pixel locations in the analog video source signal, and for generating digital character signals that are to be overlaid in predetermined pixel locations of the analog video source signal;

a digital video encoder comprising:

subcarrier direct digital synthesis (DDS) means which is responsive to the color subcarrier signals from the subcarrier generating means for separately generating a color subcarrier output signal which is locked to, and has a substantially same frequency as, the color subcarrier generated by the subcarrier generating means; and digital component video to analog video converting means which is responsive to each of (a) the color subcarrier output signal from the subcarrier DDS means, and (b) the digital character generating means for converting the digital character signals from the digital character generating means into the analog video output signal that includes the color subcarrier generated in the subcarrier DDS means for the character to be overlaid on the analog video source signal; and switching means for switching to an output of the system (a) the analog video source signal during time periods when pixels of the digital character are not to be overlaid on the analog video source signal, and (b) the analog video output signal from the digital component video to analog video converting means of the digital video encoder during time periods when pixels of the digital character are to be overlaid on the analog video source signal.

14. The system of claim 13 wherein the subcarrier generating means comprises:

a first phase lock loop (PLL) comprising a voltage controlled oscillator (VCO) for separately generating a subcarrier output signal that is locked to the predetermined color subcarrier of the analog video source signal; and a second PLL comprising a voltage controlled oscillator (VCO) for separately generating a system clock signal at a predetermined frequency that is locked to the subcarrier output signal generated by the VCO of the first PLL.

15. The system of claim 14 wherein:

the subcarrier output signal generated by the VCO of the first PLL has a frequency which is a multiple of the frequency of the predetermined color subcarrier of the analog video source signal; and the first PLL further comprises a divide-by means for reducing the frequency of the subcarrier output signal generated by the VCO of the first PLL to a frequency which is substantially equal to the frequency of the predetermined color subcarrier of the analog video source signal and is the color subcarrier output signal from the subcarrier generating means.

16. The system of claim 15 wherein the second PLL further comprises:

first converting means for converting the frequency of the subcarrier output signal from the VCO of the first PLL to a predetermined color subcarrier output frequency which is used as an output signal of the first converting means;

second converting means for converting the frequency of the system clock signal from the VCO of the second PLL to a predetermined color subcarrier output frequency equal to the output signal from the first converting means which is an output signal of the second converting means; and a phase detector for comparing the phases of the output signals from the first and second converting means, and for generating a output control signal to the VCO of the second PLL for locking the system clock signal at the output of the VCO of the second PLL to the subcarrier output signal from the VCO of the first PLL.

17. The system of claim 13 wherein the digital character generating means comprises:

horizontal and vertical genlock means for detecting horizontal and vertical timing of pixel locations in the analog video source signal, and for generating an output signal indicating the horizontal and vertical timing of the pixel locations; and a digital video source/On Screen Display (OSD) generator for receiving a digital graphics source signal and the output signal from the horizontal and vertical genlock means for generating therefrom digital character signals that are to be overlaid in predetermined pixel locations of the analog video source signal.

18. The system of claim 17 wherein the digital character generating means further comprises:
a phase lock loop (PLL) comprising a voltage controlled oscillator (VCO) for separately generating a system clock signal to the digital video source/On Screen Display (OSD) generator that is locked to the timing of the pixel locations in the analog video source signal as is generated in the output signal from the horizontal and vertical genlock means.

19. The system of claim 13 wherein the subcarrier direct digital synthesis (DDS) means comprises:
delta phase measurement means for measuring phase differences between the color subcarrier output signal from the subcarrier generating means and one of the color subcarrier output signal from the subcarrier DDS means and the color subcarrier included in the analog video output signal from the digital component video to analog video converting means for generating an output control signal that is used to lock the color subcarrier output signal from the subcarrier DDS means to the color subcarrier generated by the subcarrier generating means.

20. The system of claim 19 wherein the subcarrier direct digital synthesis (DDS) means further comprises a burst window detecting device for detecting a color subcarrier burst in the output signal from the digital component video to analog video converting means for enabling the delta phase measurement means when the color subcarrier output signal from the subcarrier generating means is coupled to first input, of the delta phase measurement mean and the analog video output signal from the digital component video to analog video converting means is coupled to second input of the delta phase measurement mean.

21. The system of claim 13 wherein:
the digital character generating means comprises means for generating enable control signals during time periods when pixels for a digital character are to be overlaid on the analog video source signal; and
the switching means is responsive to the enable control signals for directing (a) the analog video source signal to the system output during pixel locations where a digital character is not to be overlaid on the analog video source signal, and (b) the analog video output signal from the digital video encoder to the system output during pixel locations where a digital character is to be overlaid on the analog video source signal.

22. The system of claim 13 wherein an output of the digital character generating means is coupled to an input of the switching means so as to control the switching means.

23. A method of overlaying digital characters on an analog video source signal that includes a predetermined color subcarrier comprising the steps of:
(a) detecting timing of pixel locations in the analog video source signal in a digital character generating means and generating an output signal representative of such timing;
(b) generating digital character signals that are to be overlaid in predetermined pixel locations of the analog video source signal in the digital character generating means in response to the output signal from step (a);
(c) generating a separate color subcarrier signal which is locked to the predetermined color subcarrier signal in a digital video encoder;

(d) converting the digital character signals from the digital character generating means in step (b) into an analog video output signal that includes the color subcarrier generated in the digital video encoder in step (c); and
(e) switching to an output of the system (i) the analog video source signal during time periods when pixels of the digital character are not to be overlaid on the analog video source signal, and (ii) the analog video output signal from the digital video encoder during time periods when pixels of the digital character are to be overlaid on the analog video source signal by a switching means.

24. The method of claim 23 wherein prior to performing step (a), performing the step of:
(f) generating a color subcarrier signal which is locked to the predetermined color subcarrier of the analog video source signal in a subcarrier generating means.

25. The method of claim 24 wherein in step (f), performing the substeps of:
(f1) separately generating a subcarrier output signal that is locked to the predetermined color subcarrier of the analog video source signal in a first phase lock loop (PLL) comprising a voltage controlled oscillator (VCO); and
(f2) separately generating a system clock signal at a predetermined frequency that is locked to the subcarrier output signal generated by the VCO of the first PLL in step (f1) by a second PLL comprising a voltage controlled oscillator (VCO).

26. The method of claim 25 wherein:
the subcarrier output signal generated by the VCO of the first PLL in step (f1) has a frequency which is a multiple of the frequency of the predetermined color subcarrier of the analog video source signal, and in step (f1) performing the further substep of:
(f3) reducing the frequency of the subcarrier output signal generated by the VCO of the first PLL to a frequency which is substantially equal to the frequency of the predetermined color subcarrier of the analog video source signal and is the color subcarrier output signal from the subcarrier generating means in a divide-by means in the first PLL.

27. The method of claim 26 wherein in step (f2), performing the substeps of:
(f4) converting the frequency of the subcarrier output signal from the VCO of the first PLL from step (f1) to a predetermined color subcarrier output frequency which is used as an output signal of a first converting means;
(f5) converting the frequency of the system clock signal from the VCO of the second PLL to a predetermined color subcarrier output frequency equal to the output signal from the first converting means which is an output signal of a second converting means; and
(f6) comparing the phases of the output signals from the first and second converting means in steps (f4) and (f5), respectively, in a phase detector, and generating a output control signal to the VCO of the second PLL for locking the system clock signal at the output of the VCO of the second PLL to the subcarrier output signal from the VCO of the first PLL.

28. The method of claim 24 wherein in performing step (a), performing the substeps of:
(a1) detecting horizontal and vertical timing of pixel locations in the analog video source signal in a horizontal and vertical genlock means; and (a2) generating an output signal indicating the horizontal and vertical timing of the pixel locations; and in performing step (b), receiving a digital graphics source signal and the output signal from the horizontal and vertical genlock means in step (a2) in a digital video source/On Screen Display (OSD) generator for generating therefrom digital character signals that are to be overlaid in predetermined pixel locations of the analog video source signal.

29. The method of claim 28 comprising the further step of:

(a3) separately generating a system clock signal at a predetermined frequency that is locked to the output signal from the horizontal and vertical genlock means in step (a2); and by a PLL comprising a voltage controlled oscillator (VCO) and in performing step (b), receiving a digital graphics source signal, the output signal from the horizontal and vertical genlock means in step (a2), and the system clock signal generated in step (a3) in a digital video source/ On Screen Display (OSD) generator for generating therefrom digital character signals that are to be overlaid in predetermined pixel locations of the analog video source signal.

30. The system of claim 28 comprising the further step of:

in step (b), generating enable control signals during time periods when pixels for a digital character are to be overlaid on the analog video source signal; and in step (e), the switching means is responsive to the enable control signals for directing (iii) the analog video source signal to the system output during pixel locations where a digital character is not to be overlaid on the analog video source signal, and (iv) the analog video output signal from the digital video encoder to the system output during pixel locations where a digital character is to be overlaid on the analog video source signal.

31. The method of claim 24 wherein:

in performing step (c), separately generating in a subcarrier direct digital synthesis (DDS) means, which is responsive to the color subcarrier signal from the subcarrier generating means, a color subcarrier output signal which is locked to, and has a substantially same frequency as, the color subcarrier generated by the subcarrier generating means in step (a); and in performing step (d), converting the digital character signals from the digital character generating means into the analog video output signal that includes the color subcarrier generated in the subcarrier DDS means for each pixel location of the character to be overlaid on the analog video source signal in a digital component video to analog video converting means which is responsive to each of (iii) the color subcarrier output signal from the subcarrier (DDS) means, and (iv) the digital character generating means.

32. The method of claim 31 wherein in step (c), performing the substeps of:

(c1) measuring phase differences between the color subcarrier output signal from the subcarrier generating means of step (f), and one of the color subcarrier output signal from the subcarrier DDS means and the color subcarrier included in the analog video output signal from the digital component video to analog video converting means of step (c) in a delta phase measurement means; and (c2) generating an output control signal representative of the phase difference measured in step (c1) that is used to lock the color subcarrier output signal from the subcarrier DDS means in step (c) to the color subcarrier generated by the subcarrier generating means in step (f).

33. The method of claim 32 wherein including the further substeps of:

(c3) in performing step (c1), detecting a color subcarrier burst in the output signal from the digital component video to analog video converting means in a burst window detecting device for enabling the delta phase measurement means when the color subcarrier output signal from the subcarrier generating means, and the analog video output signal from the digital component video to analog video converting means are coupled to the delta phase measurement means.

* * * * *

UNITED STATES PATENT AND TRADEMARK OFFICE
CERTIFICATE OF CORRECTION

PATENT NO. : 5,801,789
DATED : September 1, 1998
INVENTOR(S) : Zeidler et al.

It is certified that error appears in the above-identified patent and that said Letters Patent is hereby corrected as shown below:

At column 6, line 45, delete "note" and insert therefor --not--.

At column 10, line 37, delete "note" and insert therefor --not--.

In claim 20, line 33, delete "mean" and insert therefor --means--.

In claim 20, line 36, delete "mean" and insert therefor --means--.

Signed and Sealed this

Twenty-second Day of December, 1998

Attest:

BRUCE LEHMAN

Attesting Officer

Commissioner of Patents and Trademarks